US008150401B2

(12) United States Patent
Howe

(10) Patent No.: US 8,150,401 B2
(45) Date of Patent: *Apr. 3, 2012

(54) METHOD AND SYSTEM FOR COMMUNICATING DATA FROM WIRELINE TERMINALS TO MOBILE TERMINALS

(75) Inventor: Walter Wesley Howe, Alpharetta, GA (US)

(73) Assignee: GTE Wireless Incorporated, Basking Ridge, NJ (US)

( * ) Notice: Subject to any disclaimer, the term of this patent is extended or adjusted under 35 U.S.C. 154(b) by 704 days.

This patent is subject to a terminal disclaimer.

(21) Appl. No.: 11/136,684

(22) Filed: May 24, 2005

(65) Prior Publication Data
US 2005/0213604 A1 Sep. 29, 2005

Related U.S. Application Data

(63) Continuation of application No. 09/516,090, filed on Mar. 1, 2000, now Pat. No. 7,054,636.

(51) Int. Cl.
*H04Q 7/20* (2006.01)
(52) U.S. Cl. ........ 455/445; 455/433; 455/461; 370/351; 379/220.01
(58) Field of Classification Search .................. 455/445, 455/417, 418, 461, 433; 370/352, 331, 402, 370/351; 379/220.01
See application file for complete search history.

(56) References Cited

U.S. PATENT DOCUMENTS

| 4,191,860 | A |   | 3/1980  | Weber          |
|-----------|---|---|---------|----------------|
| 5,210,786 | A |   | 5/1993  | Itoh           |
| 5,241,598 | A |   | 8/1993  | Raith          |
| 5,315,636 | A |   | 5/1994  | Patel          |
| 5,353,331 | A |   | 10/1994 | Emery et al.   |
| 5,400,338 | A |   | 3/1995  | Flammer, III   |
| 5,506,887 | A |   | 4/1996  | Emery et al.   |
| 5,572,528 | A | * | 11/1996 | Shuen .......................... 370/402 |
| 5,574,904 | A |   | 11/1996 | Yunoki et al.  |
| 5,610,972 | A |   | 3/1997  | Emery et al.   |
| 5,636,209 | A |   | 6/1997  | Perlman        |
| 5,664,005 | A |   | 9/1997  | Emery et al.   |
| 5,680,440 | A |   | 10/1997 | Ghisler et al. |
| 5,703,939 | A |   | 12/1997 | Bushnell       |
| 5,724,658 | A |   | 3/1998  | Hasan          |
| 5,758,281 | A |   | 5/1998  | Emery et al.   |
| 5,764,745 | A |   | 6/1998  | Chan et al.    |
| 5,790,638 | A |   | 8/1998  | Bertacchi      |
| 5,815,561 | A |   | 9/1998  | Nguyen et al.  |
| 5,842,126 | A |   | 11/1998 | Sawyer et al.  |
| 5,878,348 | A |   | 3/1999  | Foti           |
| 5,889,774 | A |   | 3/1999  | Mirashrafi et al. |

(Continued)

FOREIGN PATENT DOCUMENTS
CA 2313036 1/2001
(Continued)

*Primary Examiner* — Danh C Le

(57) ABSTRACT

Methods and systems are provided for communicating data from wireline terminals to mobile terminals in a telecommunications network, which includes a home node associated with the mobile terminal and one or more visited nodes. To establish communication with a mobile terminal, a wireline terminal sends data to a server in the telecommunications network. The server identifies a mobile identification number associated with the mobile terminal, and based on the identified mobile identification number, the server determines a route that excludes the home node when the mobile terminal is out of the geographical area served by the home node. The server then establishes via the determined route a connection to the mobile terminal and sends to the mobile terminal the data received from the wireline terminal.

12 Claims, 9 Drawing Sheets

U.S. PATENT DOCUMENTS

| | | | |
|---|---|---|---|
| 5,901,359 A * | 5/1999 | Malmstrom | 455/461 |
| 5,903,833 A | 5/1999 | Jonsson et al. | |
| 5,915,222 A | 6/1999 | Olsson et al. | |
| 5,924,035 A | 7/1999 | Joensuu | |
| 5,943,620 A | 8/1999 | Boltz et al. | |
| 5,978,677 A | 11/1999 | Sawyer | 455/432 |
| 5,978,678 A | 11/1999 | Houde et al. | 455/433 |
| 5,991,621 A | 11/1999 | Alperovich | |
| 6,002,759 A | 12/1999 | Kallioniemi et al. | |
| 6,006,094 A | 12/1999 | Lee | |
| 6,021,126 A | 2/2000 | White et al. | |
| 6,044,261 A | 3/2000 | Kazmi | |
| 6,044,274 A | 3/2000 | Vo et al. | |
| 6,075,783 A | 6/2000 | Voit | |
| 6,078,575 A | 6/2000 | Dommety et al. | |
| 6,097,801 A | 8/2000 | Williams et al. | |
| 6,125,126 A | 9/2000 | Hallenstal | |
| 6,173,157 B1 | 1/2001 | Godoroja et al. | |
| 6,259,782 B1 | 7/2001 | Gallant | |
| 6,259,783 B1 | 7/2001 | Tewani et al. | |
| 6,259,914 B1 | 7/2001 | Koster | |
| 6,330,448 B1 | 12/2001 | Otsuka et al. | |
| 6,356,756 B1 | 3/2002 | Koster | |
| 6,363,253 B1 | 3/2002 | Valentine et al. | |
| 6,408,181 B1 | 6/2002 | Ho et al. | |
| 6,434,126 B1 | 8/2002 | Park | |
| 6,463,270 B1 | 10/2002 | Chang et al. | |
| 6,466,571 B1 | 10/2002 | Dynarski et al. | |
| 6,473,411 B1 | 10/2002 | Kumaki et al. | |
| 6,487,412 B1 | 11/2002 | Brennan | |
| 6,515,974 B1 * | 2/2003 | Inoue et al. | 370/331 |
| 6,526,033 B1 | 2/2003 | Wang et al. | |
| 6,532,490 B1 | 3/2003 | Lewis et al. | |
| 6,560,458 B1 | 5/2003 | Ronkko | |
| 6,574,216 B1 | 6/2003 | Farris et al. | |
| 6,614,774 B1 * | 9/2003 | Wang | 370/338 |
| 6,671,506 B1 | 12/2003 | Lee | |
| 6,693,894 B1 * | 2/2004 | Andersson et al. | 370/352 |
| 6,757,266 B1 * | 6/2004 | Hundscheidt | 370/328 |
| 6,795,444 B1 * | 9/2004 | Vo et al. | 370/401 |
| 7,353,022 B2 | 4/2008 | Howe | |
| 2003/0039237 A1 | 2/2003 | Forslow | |
| 2008/0051082 A1 | 2/2008 | Howe | |
| 2008/0057965 A1 | 3/2008 | Howe | |

FOREIGN PATENT DOCUMENTS

| | | |
|---|---|---|
| CA | 2313111 | 1/2001 |
| WO | 98/18269 | 4/1998 |

* cited by examiner

METHOD AND SYSTEM FOR COMMUNICATING DATA FROM WIRELINE TERMINALS TO MOBILE TERMINALS

CROSS-REFERENCE TO RELATED APPLICATIONS

This is a continuation of prior U.S. patent application Ser. No. 09/516,090, filed Mar. 1, 2000 now U.S. Pat. No. 7,054,636, entitled "Method And System For Communicating Data From Wireline Terminals To Mobile Terminals," which application is related to pending U.S. patent application Ser. No. 09/340,508, entitled "Method And System For Routing Calls To Wireless Directory Numbers In A Network," the contents of which are hereby incorporated by reference.

BACKGROUND OF THE INVENTION

1. Field of the Invention

The present invention relates to communication networks and, more particularly, to a method and system for communicating data from wireline terminals to mobile terminals.

2. Background of the Art

In telecommunications networks, a wireline directory number (DN) is associated with a fixed geographic location and is served by a single wireline switch. A wireless DN, however, is associated with multiple geographic locations and is served by any one of a number of wireless switches depending on the specific geographic location of an associated wireless device at the time a call is made. This portability of a wireless DN is one of the basic attributes of wireless telephony.

A pair of home location register and visited location register in a telecommunications network provides seamless roaming when a call is placed to or from a wireless DN. A home location register is associated with a home wireless switch where all incoming calls to a wireless DN are first directed. A wireless device associated with a wireless DN is located within its home area when the wireless device can directly communicate with its associated home wireless switch (i.e., the wireless device is located in a geographical area served by the home wireless switch).

A visited location register is associated with a wireless switch that serves a wireless device when the wireless device is outside of its home area. A wireless device associated with a wireless DN is outside of its home area (or roams) when the wireless device cannot directly communicate with its associated home wireless switch and instead communicates with another wireless switch (hereinafter referred to "visited wireless switch").

One problem with the present telecommunication networks is that two connections must be established when a call is placed to a wireless DN whose associated wireless device is outside of its home area. In such instances, the telecommunications network must establish a first connection to the home wireless switch associated with the wireless DN. The home wireless switch then must establish a second connection to a visited wireless switch serving the wireless DN.

As an illustration, consider data communication applications in the trucking and postal industries. These industries often use complex data communication networks for controlling and monitoring from fixed locations the activities of field personnel who are mobile and are geographically dispersed over a wide area. These data communication networks typically use conventional telecommunications networks for establishing communication between wireline data processing devices, such as desk top computers located in centralized offices, and wireless data processing devices, such as mobile terminals used by field personnel.

FIG. 1 shows a block diagram of one such conventional telecommunications network 100. Telecommunications network 100 comprises a wireline switch 110, a home wireless switch 120, a home location register 130, a signal transfer point (STP) 135, a visited location register 140, a visited wireless switch 150, a wireline terminal 155, such as a desktop personal computer, antenna 170, wireless modems $175_1$-$175_K$, and mobile terminals $178_1$-$178_K$. Wireline terminal 155 establishes communication with mobile terminals $178_1$-$178_K$ via wireless modems $175_1$-$175_K$, respectively.

To establish communication with one of mobile terminals $178_1$-$178_K$, for example mobile terminal $178_1$, wireline terminal 155 executes a dialup program, such as the Microsoft Dialer software developed by Microsoft. The dialup program initiates a call request 180a by dialing the wireless DN associated with wireless modem $175_1$. When wireline switch 110 receives call request 180a, wireline switch 110 establishes a first connection 180b via a Public Switched Telephone Network (PSTN) 160 to home wireless switch 120, the home switch associated with the dialed wireless DN.

Home wireless switch 120 sends an "Interim Standard 41" (IS-41) RouteRequest message 180c to its associated home location register 130, requesting the current location of wireless modem $175_1$. The ANSI-41 standard is described in "Radio Telecommunications Intersystem Operations," ANSI/TIA/EIA/41-D-1997, which is incorporated herein by reference. The IS-41 standard describes the communication protocol between home wireless switch 120, home location register 130, visited location register 140, and visited wireless switch 150 in telecommunications network 100.

If wireless modem $175_1$ is outside of its home area as shown in FIG. 1, home location register 130 then identifies the visited location register with which wireless modem $175_1$ last registered, for example visited location register 140, and sends an IS-41 RouteRequest message 180d via STP 135 to visited location register 140.

Visited location register 140 forwards the RouteRequest message 180d to its associated visited wireless switch 150, requesting a route to wireless modem $175_1$. Visited wireless switch 150 computes a temporary local directory number (TLDN), which is used to establish incoming calls to wireless modem $175_1$ when wireless modem $175_1$ is served by visited wireless switch 150. Visited wireless switch 150 then returns the TLDN to visited location register 140 in an IS-41 message 180e. Visited location register 150 then sends via STP 135 to home location register 130 an IS-41 RouteRequest response message 180f that includes the TLDN.

Home location register 130 forwards the RouteRequest response message 180f to home wireless switch 120. Based on the TLDN in the RouteRequest response message 180f received from home location register 130, home wireless switch 130 then establishes a second connection 180g to visited wireless switch 150. Visited wireless switch 150 then sends a ring signal to wireless modem $175_1$. When wireless modem $175_1$ receives the ring signal, wireless modem $175_1$ notifies a dialup program running on mobile terminal $178_1$, such as the Microsoft Dialer software developed by Microsoft and, waits for a response. When the dialup program responds, wireless modem $175_1$ sends an answer signal via visited wireless switch 150 to wireline terminal 155, thus establishing a call between mobile terminal $178_1$ and wireline terminal 155. Accordingly, telecommunications network 100 must establish two separate connections 180b and 180g to establish communication between wireline terminal 155 and mobile terminal 178$_1$ when mobile terminal 178$_1$ resides outside of its home area.

SUMMARY OF THE INVENTION

It is therefore desirable to have a method and system for reducing the number of connections that must be established in a telecommunications network to communicate data from a wireline terminal to one or more mobile terminals that are located outside of their respective home areas.

Methods and systems consistent with the present invention communicate data from a wireline terminal to a mobile terminal in a telecommunications network, which includes a home node associated with the mobile terminal and one or more visited nodes. The home node serves the mobile terminal when the mobile terminal is in a geographical area served by the home node. However, when the mobile terminal is outside of the geographical area served by home node, one of the visited nodes serves the mobile terminal.

To establish communication with the mobile terminal, the wireline terminal sends data to a server in the telecommunications network. The server identifies a mobile identification number associated with the mobile terminal, and based on the identified mobile identification number, the server determines a route that excludes the home node when the mobile terminal is out of the geographical area served by the home node. The server then establishes via the determined route a connection to the mobile terminal and sends on that connection the data received from the wireline terminal to the mobile terminal.

BRIEF DESCRIPTION OF THE DRAWINGS

The foregoing summary and the following description of the invention should not restrict the scope of the claimed invention. Both provide examples and explanations to enable others to practice the invention. The accompanying drawings, which form part of the description of the invention, show several embodiments of the invention, and together with the description, explain the principles of the invention.

In the Figures.

DETAILED DESCRIPTION

The following description of embodiments of this invention refers to the accompanying drawings. Where appropriate, the same reference numbers in different drawings refer to the same or similar elements.

A telecommunications network in accordance with methods and systems consistent with the present invention comprises a wireline terminal, a plurality of mobile terminals, a home switch associated with one or more of the mobile terminals, one or more visited switches, and a server. To establish communication with a mobile terminal, the wireline terminal sends via a packet network data packets to the server. Based on information in the data packets, the server identifies a mobile identification number associated with the mobile terminal. In one embodiment, the information in the data packets may include a mobile terminal identifier associated with one of the mobile terminals. In another embodiment, the information in the data packets may include one of a plurality of IP addresses assigned to the server.

The server then determines a route depending on the geographical location of the mobile terminal. If the mobile terminal is outside of a geographical area served by the home switch, the determined route excludes the home switch. However, if the mobile terminal is within the geographical area served by the home switch, however, the determined route includes the home switch. The server then establishes via the determined route a connection to the mobile terminal and sends the data packets on that connection to the mobile terminal.

Figure 1:
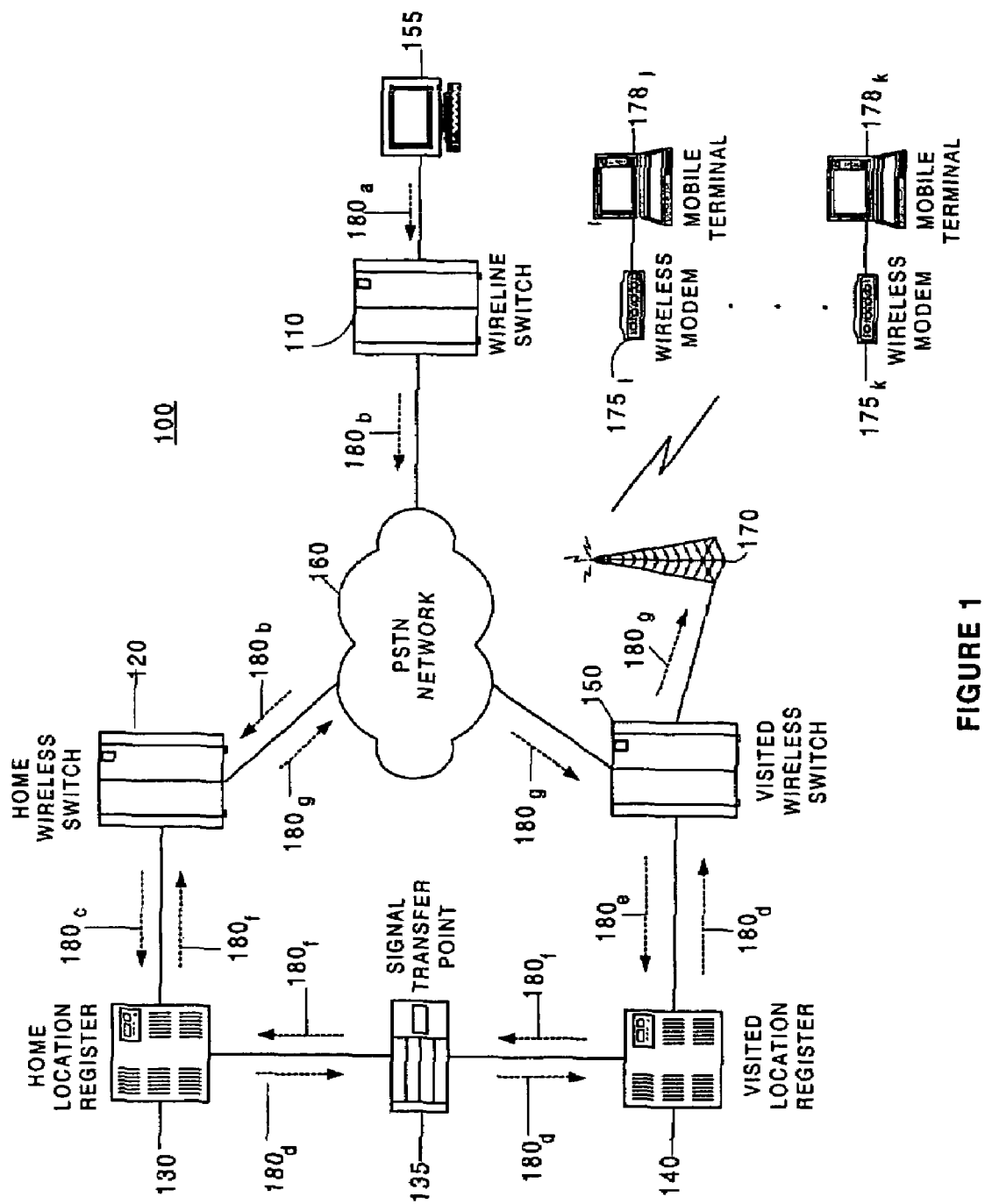
FIG. 1 is a block diagram of a conventional telecommunications network.
Figure 2:
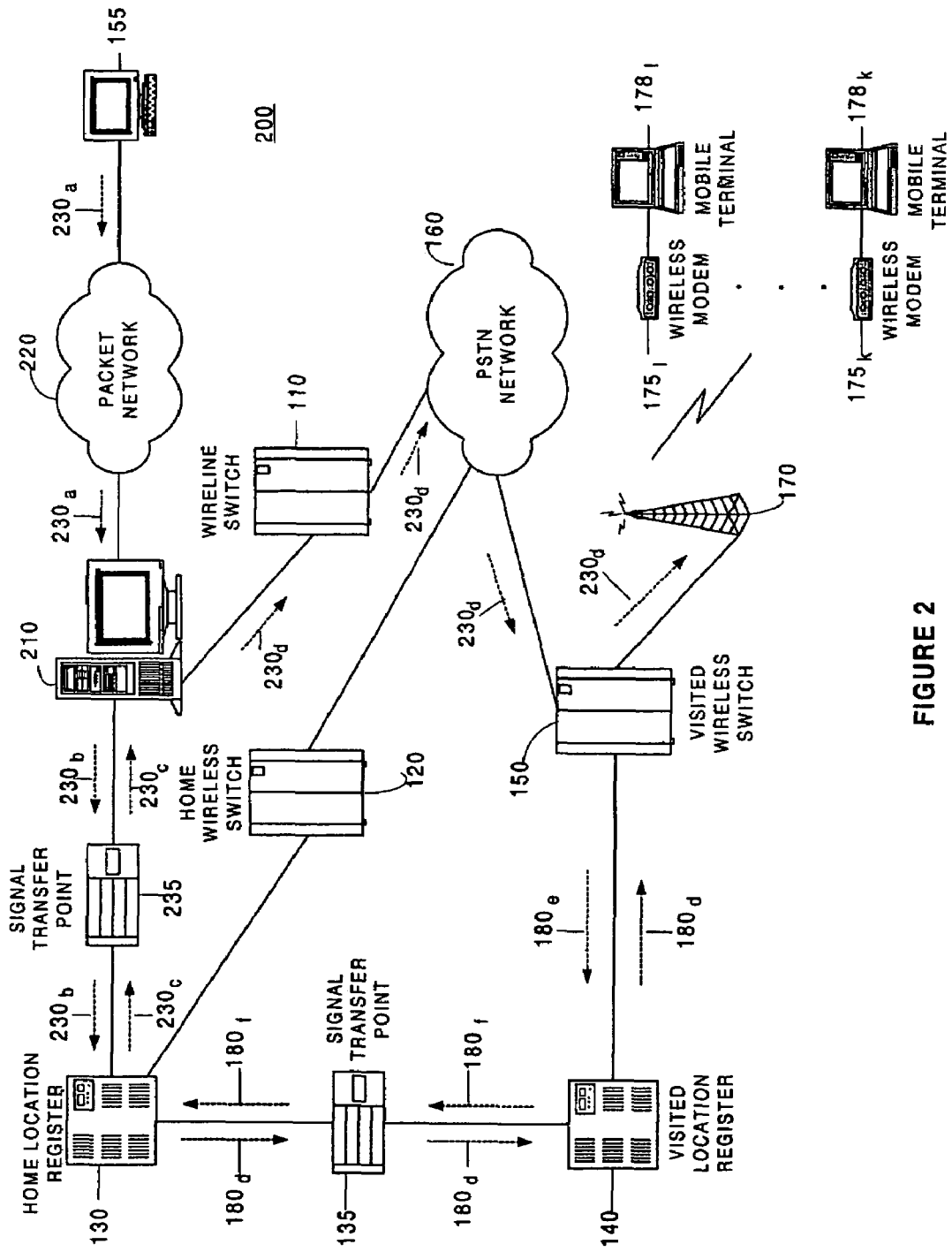
FIG. 2 is a block diagram of a telecommunications network, in accordance with methods and systems consistent with the present invention.

FIG. 2 is a block diagram of a telecommunications network 200 in accordance with methods and systems consistent with the invention. As shown, telecommunications network 200 comprises a server node 210, packet network 220, signal transfer points (STPs) 135 and 235, wireline switch 110, home wireless switch 120, home location register 130, visited location register 140, visited wireless switch 150, antenna 170, wireless modems 175$_1$-175$_K$, and mobile terminals 178$_1$-178$_K$.

Server node 210 interfaces wireline switch 110, STP 235, and packet network 220. As described below, server node 210 receives via packet network 220 data packets destined for mobile terminals 178$_1$-178$_K$ and sends the data packets to mobile terminals 178$_1$-178$_K$ by establishing in telecommunications network 200 a single connection to each of wireless modems 175$_1$-175$_K$ associated with mobile terminals 178$_1$-178$_K$ regardless of whether wireless modems 175$_1$-175$_K$ reside within or outside of their respective home areas.

Packet network 220 may include an Internet Protocol (IP) network capable of transporting packets from wireline terminal 155 to server node 210.

Home location register 130 interfaces via STP'235 with server 210 and via STP 135 with visited location register 140. Home location register 130 stores information about wireless subscribers in telecommunications network 200, such as the current location of wireless modems 175$_1$-175$_K$, billing information for wireless modems $175_1$-$175_K$, and the services wireless modems $175_1$-$175_K$ are authorized to use.

Visited location register 140 stores information about the current location of wireless modems $175_1$-$175_K$ when wireless modems $175_1$-$175_K$ reside outside of their respective home areas. For example, wireless modem $175_1$ resides within its home area when wireless modem $175_1$ directly communicates with home wireless switch 120. However, wireless modem $175_1$ resides outside of its home area when wireless modem $175_1$ cannot directly communicate with home wireless switch 120 and instead communicates with, for example, visited wireless switch 150.

STPs 135 and 235 route signaling messages such as, IS-41, Advanced Intelligent Network (AIN), and SS7 messages in telecommunications network 200. Each STP 135 and 235 may be an adjunct to a wireline or a wireless switch in telecommunications network 200.

Figure 3:
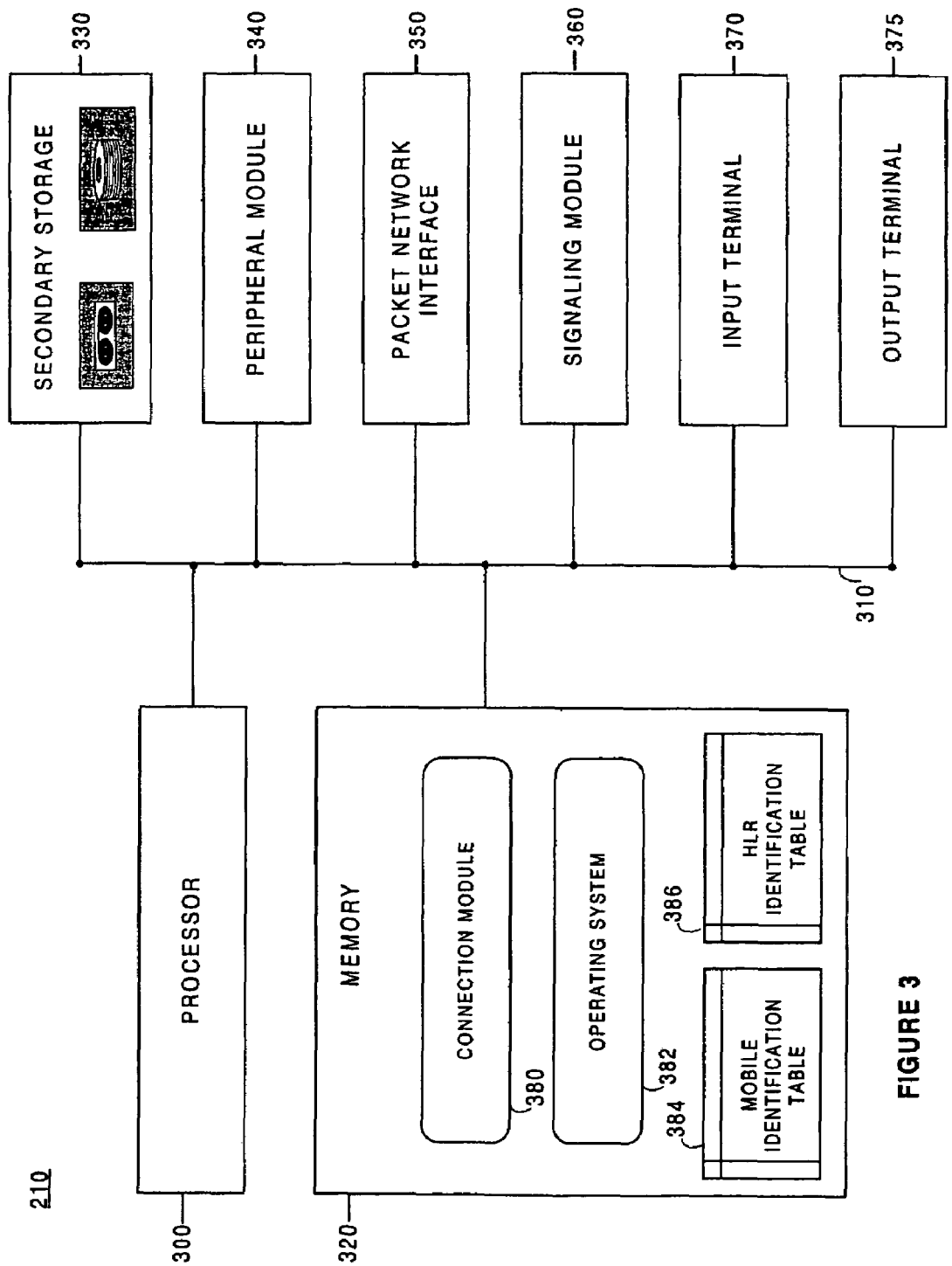
FIG. 3 is a block diagram of a server node in a telecommunications network, in accordance with methods and systems consistent with the present invention.

FIG. 3 is a block diagram of server node 210 in accordance with methods and systems consistent with the invention. Server node 210 may be a SUN Microsystems, Inc. server configured with the SOLARIS™ operating system. As shown, server node 210 comprises a processor 300, which connects via bus 310 to a memory 320, secondary storage 330, peripheral module 340, packet network interface 350, signaling module 360, input terminal 370, and an output terminal 375.

Memory 320 includes a connection module 380, an operating system 382, a mobile identification table 384, and an HLR identification table 386. Connection module 380 includes software and information for establishing, maintaining, terminating, and managing communication between wireline terminal 155 and mobile terminals $178_1$-$178_K$. Mobile identification table 384 includes information for identifying mobile identification numbers (MINs) associated with wireless modems $175_1$-$175_K$. HLR identification table 386 includes information for identifying home location registers associated with wireless modems $175_1$-$175_K$.

Secondary storage 330 includes a computer readable medium such as a disk drive and a tape drive. From the tape drive, software and data may be loaded onto the disk drive, which can then be copied into memory 320. Similarly, software and data in memory 320 may he copied onto the disk drive, which can then be loaded onto the tape drive.

Peripheral module 340 includes software and data for interfacing a bank of modems (not shown) through which connection module 380 establishes calls to mobile terminals $178_1$-$178_K$. The bank of modems interface with wireline switch 110 and wireless switch 120 and may include, for example, a plurality of Total Control™ Multiservice Access Platform modems manufactured by 3Com Corporation. Peripheral module 340 may establish the calls using any known dialup protocol such as, the Point-To-Point protocol.

Packet network interface 350 includes software and data for interfacing packet network 220. For example, packet network interface 350 transmits and receives IP packets via packet network 220. Packet network interface 350 segments data received from connection module 380 into IP packets, and using a transport protocol such as, the Transmission Control Protocol over IP (TCP/IP) protocol, transmits the packets via packet network 220 to wireline terminal 155. Likewise, packet network interface 350 receives IP packets from wireline terminal 155 via packet network 220 and reassembles the packets into an internal format for processing by connection module 380.

Signaling interface module 360 transmits and receives via STP 225 signaling information, such as IS-41 messages. For example, signaling interface module 360 converts signaling information generated by connection module 380 into IS-41 messages and transmits the messages to STP 235. Likewise, signaling interface module 350 receives IS-41 messages from STP 235 and converts the messages into an internal format for processing by connection module 380.

Input terminal 370 may include an input device such as, a keyboard, and output terminal 375 may include a display device.

In one embodiment, mobile identification table 384 in server node 210 is configured to associate mobile terminal identifier (ID) information in the data packets received from wireline terminal 155 to a mobile identification number associated with one of wireless modems $175_1$-$175_K$. In this embodiment, to establish communication with one of mobile terminals $178_1$-$178_K$, for example mobile terminal $178_1$, wireline terminal 155 segments data into one or more data packets 230*a* each of which includes mobile terminal ID information associated with mobile terminal $178_1$. Wireline terminal 155 then sends the data packets 230*a* via packet network 220 to server node 210. Based on the mobile terminal ID information in the data packets 230*a*, server node 210 identifies a mobile identification number associated with wireless modem $175_1$. As shown below, based on the identified mobile identification number, server node 210 then establishes a connection to mobile terminal $178_1$ via wireless modem $175_1$.

Figure 4:
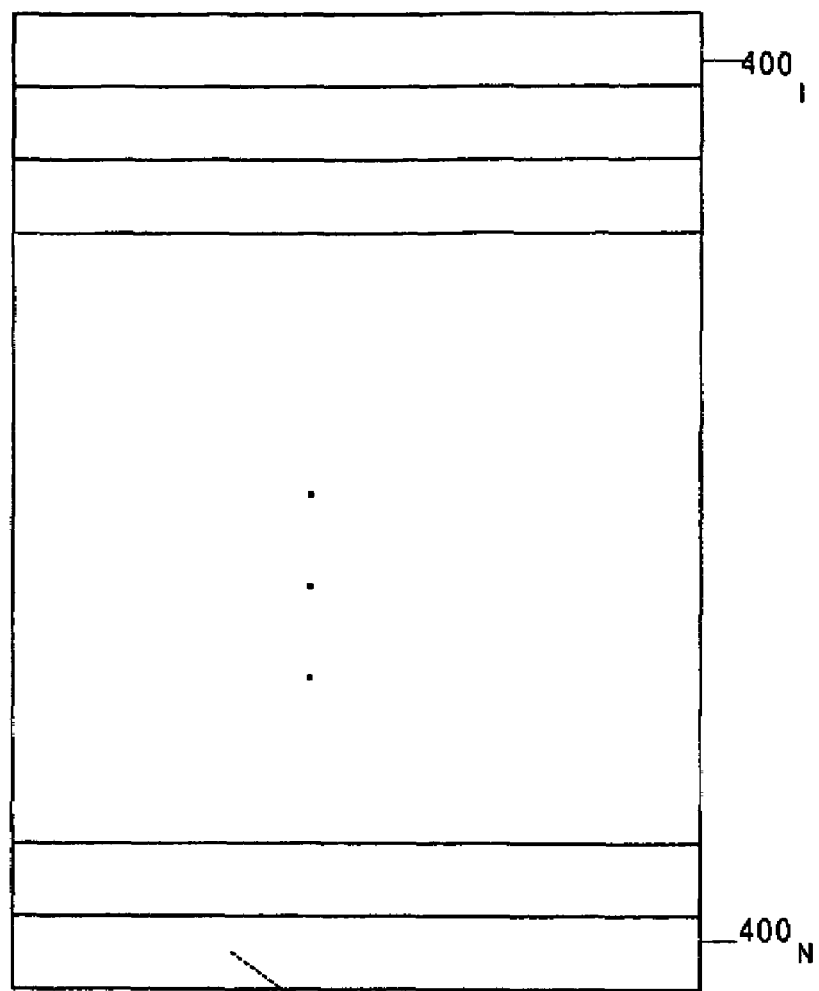
FIG. 4 is a block diagram of a mobile identification table in a server node, in accordance with methods and systems consistent with the present invention where each mobile terminal is associated with a unique mobile terminal identifier.
Figure 4:
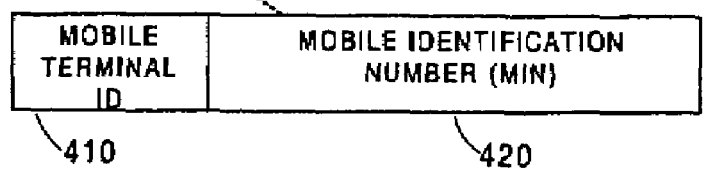

FIG. 4 is a block diagram of mobile identification table 384 in server node 210, in accordance with an embodiment where mobile identification table 384 is configured to associate mobile terminal ID information to mobile identification numbers associated with wireless modems $175_1$-$175_K$. As shown, mobile identification table 384 includes entries $400_1$-$400_N$, where N is an integer. Each entry includes a mobile terminal ID 410 and a mobile identification number 420. Each mobile identification number 420 identifies one of wireless modems $175_1$-$175_K$.

Figure 5:
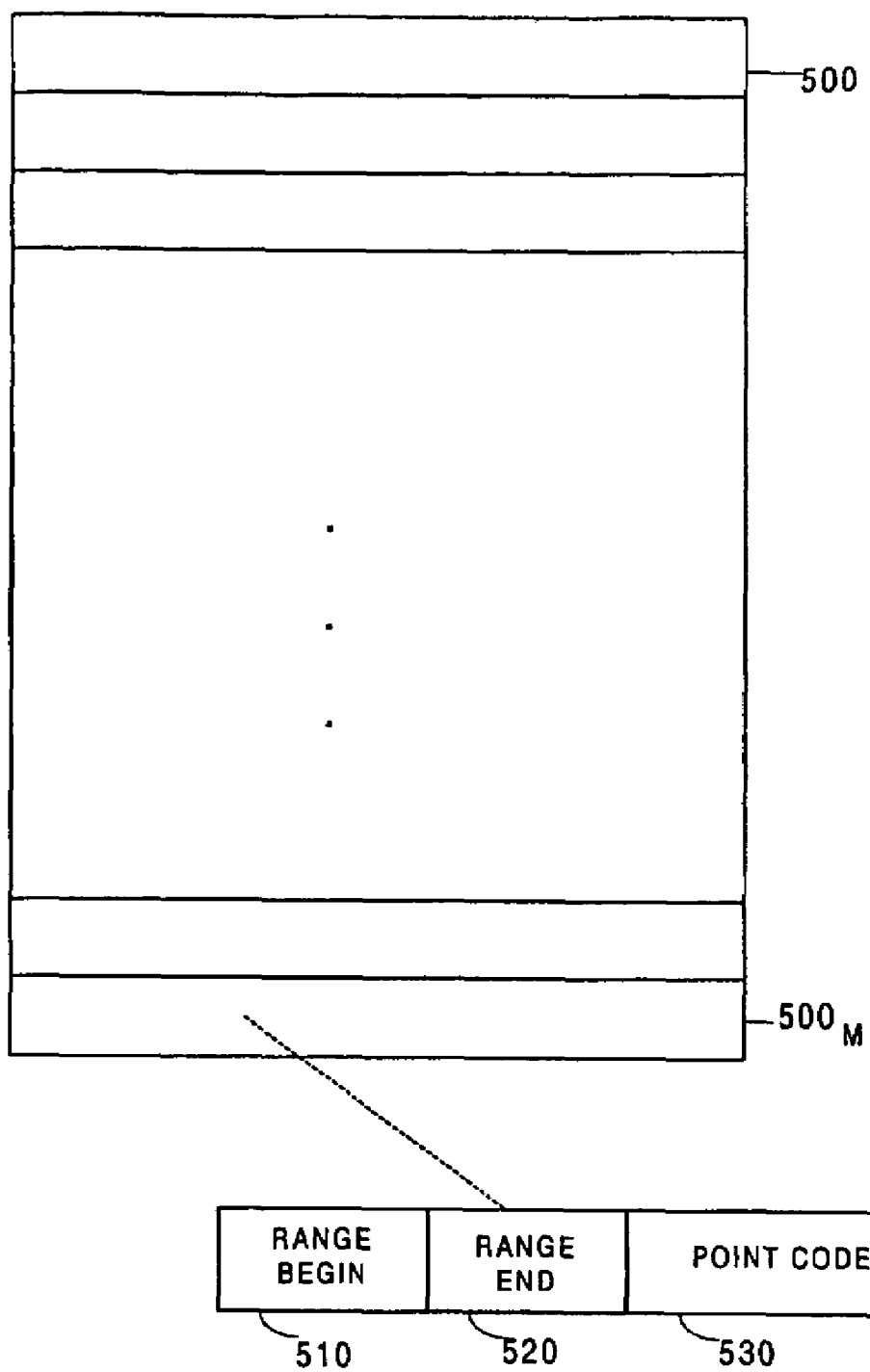
FIG. 5 is a block diagram of a home location register identification table in a server node, in accordance with methods and systems consistent with the present invention.

FIG. 5 is a block diagram of HLR identification table 386 in server node 210, in accordance with methods and systems consistent with the invention. HLR identification table 386 includes entries $500_1$-$500_M$, where M is an integer. Each entry includes a range begin 510, a range end 520, and a point code 530. Range begin 510 includes a 10 digit string, such as a mobile identification number, which identifies a beginning of a range of mobile identification numbers. Range end 520 also includes a 10 digit string, such as a mobile identification number, which identifies an end of the range of mobile identification numbers. Point code 530 includes a numeric string that identifies in telecommunications network 200 a home location register associated with mobile identification numbers that are in the range of mobile identification numbers identified by range begin 510 and range end 520.

Figure 6:
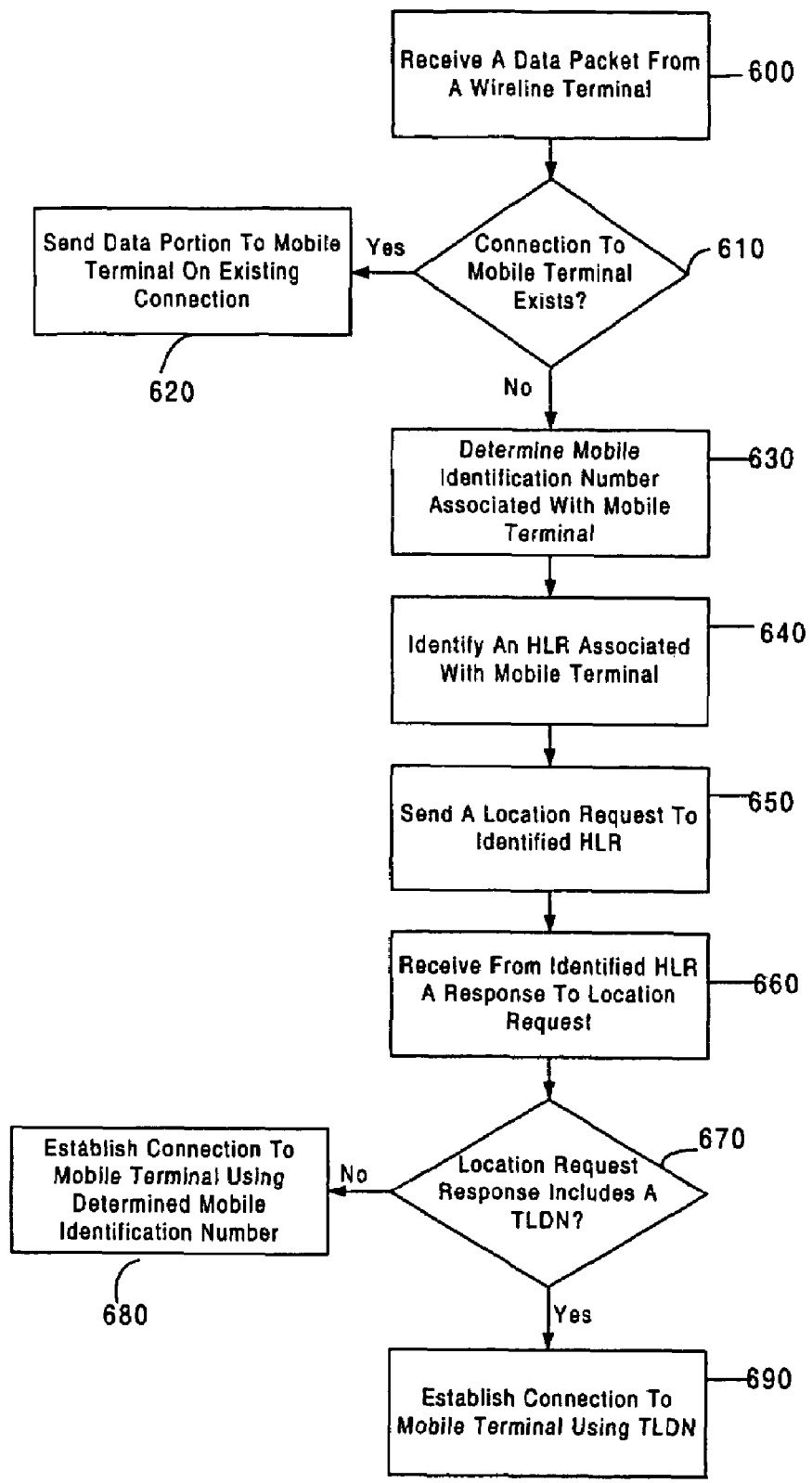
FIG. 6 is a flow chart of the steps performed by a connection module in a server node, in accordance with methods and systems consistent with the present invention.

FIG. 6 is a flow chart of the steps performed by connection module 380 in server node 210, in accordance with methods and systems consistent with the invention. Connection module 380 receives one or more data packets 230*a* from wireline terminal 155 (step 600). For example, to communicate data with one of mobile terminals $178_1$-$178_K$, for example mobile terminal $178_1$, wireline terminal 155 establishes a TCP/IP connection to server node 210 via packet network 220. Wireline terminal 155 then segments the data into one or more data packets 230*a* each of which includes a mobile terminal ID associated with mobile terminal $178_1$. Wireline terminal 155 then sends the data packets 230*a* over the TCP/IP connection to server node 210.

Figure 7:
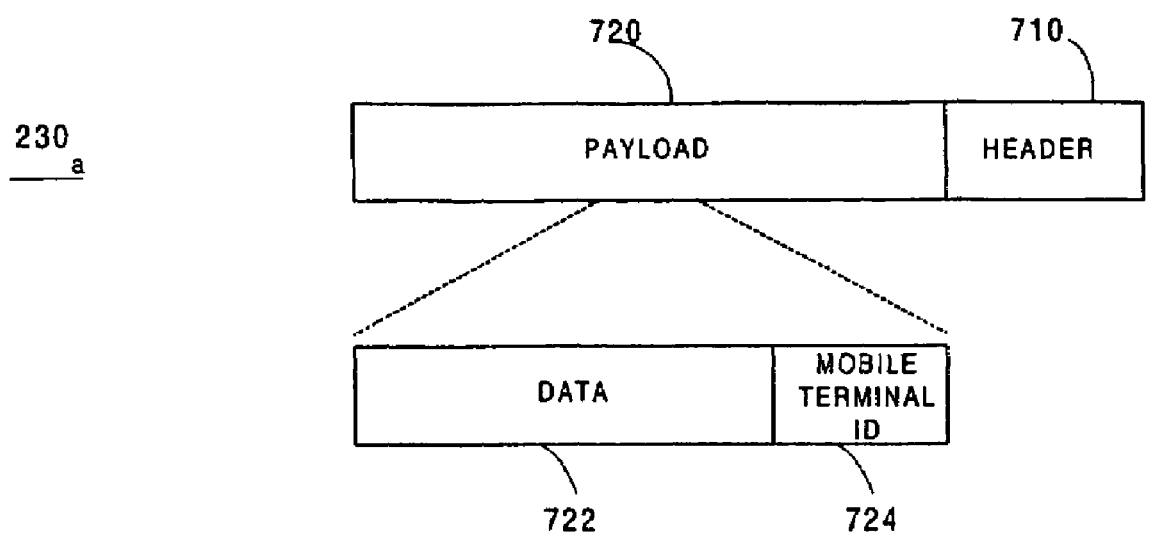
FIG. 7 illustrates a packet format for communication between a wireline terminal and a server node, in accordance with methods and systems consistent with the present invention, where each mobile terminal is associated with a unique mobile terminal identifier.

FIG. 7 illustrates format of each data packet 230*a*, in accordance with an embodiment of the invention. In the embodiment shown, each data packet 230*a* may be in the form of an IP packet, which includes a header field 710 and a payload field 720. Payload field 720 may include a data portion 722 and a mobile terminal ID portion 724. Data portion 722 may include information in any format such as, text, video, and audio. Mobile terminal ID portion 724 may identify one of mobile terminals $178_1$-$178_K$, for example mobile terminal $178_1$.

When connection module 380 receives the data packets 230a from wireline terminal 155, connection module 380 determines whether a connection already exists from server node 210 to mobile terminal $178_1$ (step 610). If connection module 380 determines that a connection exists, connection module 380 sends data portion 722 of each of the data packets 230a to mobile terminal $178_1$ via the existing connection (step 620).

However, if connection module 380 determines that a connection does not exist from server node 210 to mobile terminal $178_1$, connection module 380 determines a mobile identification number associated with wireless modem $175_1$ (step 630). For example, using mobile terminal id 724 as an index into mobile identification table 384, connection module 380 identifies an entry that includes the mobile identification number associated with wireless modem $175_1$.

Based on the determined mobile identification number, connection module 380 then identifies a home location register associated with wireless modem $175_1$ (step 640). For example, using the determined mobile identification number as an index into HLR identification table 386, connection module 380 identifies an entry whose range begin 510 and range end 520 define a set of mobile identification numbers that includes the determined mobile identification number. Connection module 380 then uses point code 530 in that entry to identify an associated home location register, for example, home location register 130.

Connection module 380 sends an IS-41 LocationRequest message 230b via STP 235 to the identified home location register 130, requesting a route for establishing a call to the identified mobile identification number (step 650). In response to the IS-41 LocationRequest message 230b, connection module 380 may receive from home location register 130 a IS-41 LocationRequest response message 230c (step 660).

Connection module 380 then determines whether the IS-41 LocationRequest response message 230c includes a temporary local directory number (TLDN) (step 670). If the IS-41 LocationRequest response message 230c does not include a TLDN and instead includes the mobile identification number associated with wireless modem $175_1$, connection module 380 determines that wireless modem $175_1$ resides within its home area.

Using the mobile identification number associated with wireless modem $175_1$, connection module 380 then establishes a call to wireless modem $175_1$ via a route that includes home wireless switch 120 as follows (step 680): Connection module 380 seizes via peripheral module 340 a modem from the bank of modems interfacing home wireless switch 120. Connection module 380 then initiates a call to wireless modem $175_1$ via the modem and home wireless switch 120 using the mobile identification number associated with wireless modem $175_1$. Connection module 380 may initiate and establish the call using a dialup protocol, such as the Point-To-Point protocol. For example, connection module 380 may invoke a dialup program, such as the Microsoft Dialer software developed by Microsoft, to establish the call. When the call is established, connection module 380 then sends the data portion 722 of each of the data packets 230a via the established call to mobile terminal $178_1$.

However, if the IS-41 LocationRequest response message 230c includes a TLDN associated with wireless modem $175_1$, connection module 380 determines that wireless modem $175_1$ resides outside of its home area as shown in FIG. 2. Server node 210 receives the TLDN associated with wireless modem $175_1$ as follows: In response to the IS-41 LocationRequest message 230b received from server node 210, home location register 130 identifies a visited location register with which wireless modem $175_1$ last registered, for example visited location register 140, and sends an IS-41 RouteRequest message 180d via STP 135 to the identified visited location register 140. Visited location register 140 then forwards the IS-41 RouteRequest message 180d to its associated visited wireless switch 150, requesting a route to wireless modem $175_1$.

Visited wireless switch 150 computes a TLDN for establishing incoming calls to wireless modem $175_1$ when wireless modem $175_1$ is served by visited wireless switch 150. Visited wireless switch 150 then returns the TLDN to visited location register 140 in an IS-41 message 180e. Visited location register 140 then sends via STP 135 to home location register 130 an IS-41 RouteRequest response message 180f, which includes the TLDN. When home location register 130 receives the IS-41 RouteRequest response message 180f via STP 135, home location register 130 sends via STP 235 to server node 210 an IS-41 LocationRequest response message 230c, which includes the TLDN.

Since the TLDN in the IS-41 LocationRequest response message 230c does not match the mobile identification number associated with wireless modem $175_1$, connection module 380 determines that wireless modem $175_1$ resides outside of its home area. Using the TLDN, connection module 380 then establishes a call 230d to wireless modem $175_1$ via a route that includes wireline switch 110, PSTN network 160, and visited wireless switch 150 (step 690).

For example, connection module 380 seizes via peripheral module 340 a modem from the bank of modems interfacing wireline switch 110, and using the TLDN associated with wireless modem $175_1$, initiates call 230d to wireless modem $175_1$. Connection module 380 may initiate and establish call 230d using a dialup protocol, such as the Point-To-Point protocol. For example, connection module may invoke the Microsoft Dialer software to establish call 230d to wireless modem $175_1$.

When connection module initiates call 230d, wireless modem $175_1$ receives a ring signal from visited wireless switch 150. Wireless modem $175_1$ then notifies a dialup program running on mobile terminal $178_1$, such as the Microsoft Dialer software, and waits for a response. When the dialup program responds, wireless modem $175_1$ sends an answer signal via visited wireless switch 150 to server node 210, thus establishing call 230d between mobile terminal $178_1$ and wireline terminal 155.

When call 230d is established to mobile terminal $178_1$, connection module 380 sends the data portion 722 of each of the data packets 230a via call 230d to mobile terminal $178_1$. Accordingly, only a single call 230d or connection is established in telecommunications network 200 to provide data communication between wireline terminal 155 and mobile terminal $178_1$ when mobile terminal $178_1$ resides outside of its home area.

In another embodiment, server node 210 is preassigned K unique IP addresses and is configured to associate the IP address information in data packets received from wireline terminal 155 to mobile terminals $178_1$-$178_K$. Accordingly, to establish communication with mobile terminals $178_1$-$178_K$, wireline terminal 155 segments data into one or more data packets each of which includes as its destination address one of the K IP addresses assigned to server node 210. Wireline terminal 155 then transmits the data packets via packet network 220 to server node 210. When server node 210 receives each data packet, server node 210 associates the IP destination address information in the data packet with one of mobile terminals 178$_1$-178$_K$ and establishes a connection to the associated mobile terminal.

Figure 8:
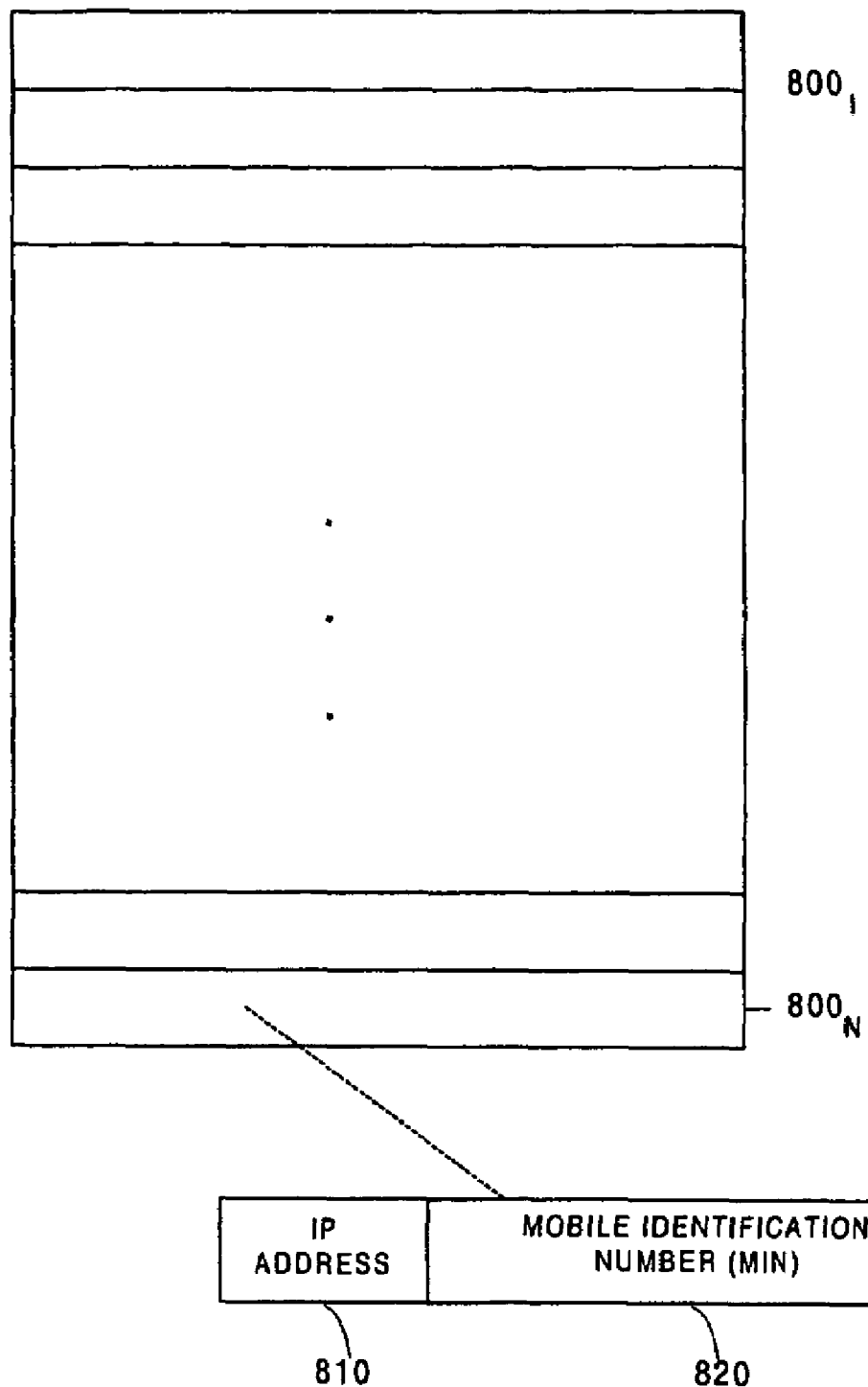
FIG. 8 is a block diagram of a mobile identification table in a server node, in accordance with methods and systems consistent with the present invention, where the server node is assigned a plurality of Internet Protocol (IP) addresses which the server node associates with a plurality of mobile terminals.

FIG. 8 is a block diagram of mobile identification table 384 in server node 210, in accordance with methods and systems consistent with the invention, where server node 210 is assigned K IP addresses. As shown, mobile identification table 384 includes entries 800$_1$-800$_N$, where N is an integer. Each entry includes an IP address 810 and a mobile identification number 820. Each mobile identification number 820 identifies one of wireless modems 175$_1$-175$_K$.

Figure 9:
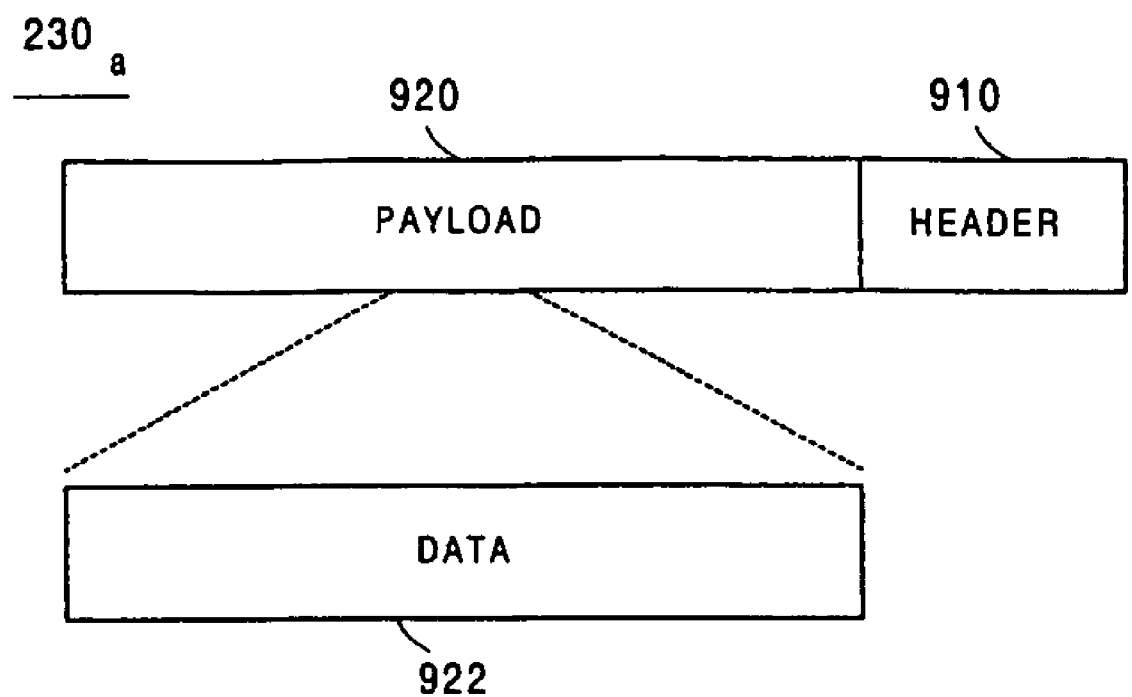
FIG. 9 illustrates a packet format for communication between a wireline terminal and a server node, in accordance with methods and systems consistent with the present invention, where each mobile terminals is associated with a unique IP address.

FIG. 9 illustrates a packet format for communication between wireline terminal 155 and server node 210, in accordance with methods and systems consistent with the invention, where server node 210 is assigned K IP addresses. In the embodiment shown, data packet 230a may be in the form of an IP packet, which includes a header field 910 and a payload field 920. The destination address field in header field 910 may include one of K IP addresses assigned to server node 210. Payload field 720 includes a data portion 922, which may include information in any format such as, text, video, and audio.

In this embodiment, connection mode 380 performs the steps 600 through 660 shown in FIG. 6 and described above, with the following modifications: Wireline terminal 155 segments data into one or more IP packets 230a, which are addressed to one of K IP addresses assigned to server node 210. To establish communication with one of mobile terminals 178$_1$-178$_K$, for example mobile terminal 178$_1$, wireline terminal 155 sends the data packets 230a to server node 210. When server node 210 receives the data packets 230a, connection module 380 determines a mobile identification number associated with wireless modem 175$_1$ based on the IP address in the destination address field in header 910 of each of the data packets 230a. For example, using the destination IP address as an index into mobile identification table 384, connection module 380 determines the associated mobile identification number. Connection module 380 then determines a home location register associated with the determined mobile identification number, for example home location register 130, and establishes a connection to mobile terminal 178$_1$ by performing the steps described above.

Although aspects of one implementation are depicted as being stored in memory, one skilled in the art will appreciate that all or part of systems and methods consistent with the present invention may be stored on or read from other computer-readable media, such as secondary storage devices, like hard disks, floppy disks, and CD-ROM; a carrier wave received from a network such as the Internet; or other forms of ROM or RAM. Finally, although specific components of a wireline switch and signaling node have been described, one skilled in the art will appreciate that a wireline switch and signaling node suitable for use with methods and systems consistent with the present invention may contain additional or different components.

While it has been illustrated and described what are at present considered to be preferred embodiments and methods of the present invention, it will be understood by those skilled in the art that various changes and modifications may be made, and equivalents may be substituted for elements thereof without departing from the true scope of the invention.

In addition, many modifications may be made to adapt a particular element, technique or implementation to the teachings of the present invention without departing from the central scope of the invention. Therefore, it is intended that this invention not be limited to the particular embodiments and methods disclosed herein, but that the invention include all embodiments falling within the scope of the appended claims.

What is claimed is:

1. A method comprising:
   receiving a data packet, at a network node, from a packet network destined for a mobile terminal;
   determining a route that excludes a home node associated with the mobile terminal when a visited node serves the mobile terminal for communicating the received data packet, to the mobile terminal, where determining the route includes:
   determining that the mobile terminal is not being served by the home node,
   obtaining a temporary identifier associated with the mobile terminal,
   establishing a connection to the mobile terminal using the temporary identifier;
   receiving a second data packet, at the network node, from the mobile terminal, destined for a wireline terminal connected to the packet network; and
   sending the second data packet to the wireline terminal via the packet network.

2. The method of claim 1, further comprising:
   sending the received data packet from the network node to the visited node via the route.

3. The method of claim 1, where the temporary identifier is a Temporary Local Directory Number (TLDN).

4. The method of claim 1, where a route between the mobile terminal and the wireline terminal includes a wireline switch, a Public Switched Telephone Network (PSTN) and a visited wireless switch.

5. The method of claim 1, where the determining that the mobile terminal is not being served by the home node includes:
   sending a location request message from the network node to a home location register, associated with the home node; and
   receiving from the home location register, associated with the home node, a response message, where the response message includes a Temporary Local Directory Number (TLDN), the TLDN corresponding to the temporary identifier.

6. A memory device storing instructions executable by a processor to cause the processor to:
   receive a data packet, at the network node, from a packet network destined for the mobile terminal;
   determine that the mobile terminal is not being served by a home node associated with the mobile terminal;
   obtain a temporary identifier associated with the mobile terminal,
   establishing a connection, that avoids the home node and using the temporary identifier, to the mobile terminal to communicate the received data packet to the mobile terminal;
   receive a second data packet, at the network node, from the mobile terminal, destined for a wireline terminal connected to the packet network; and
   send the second data packet to the wireline terminal via the packet network.

7. A method, comprising:
   receiving, by a first network node, a data packet from a packet network, the data packet destined for a mobile terminal remote from the first network node, the mobile terminal associated with a home node;

determining that the mobile terminal is not being served by the home node;

obtaining a temporary identifier associated with the mobile terminal, establishing an at least partially wireless connection between the first network node and the mobile terminal using the temporary identifier, where the at least partially wireless connection includes a visited node that is remote from the home node and does not include the home node;

sending the received data packet from the first network node to the mobile terminal via the at least partially wireless connection between the first network node and the mobile terminal;

receiving a second data packet, at the first network node, from the mobile terminal, destined for a wireline terminal connected to the packet network; and sending the second data packet to the wireline terminal via the packet network.

8. The method of claim 7, where the temporary identifier is a Temporary Local Directory Number (TLDN).

9. A memory device storing instructions executable by a processor to cause the processor to:

receive, by a first network node, a data packet from a packet network, the data packet destined for a mobile terminal remote from the first network node, the mobile terminal associated with a home node;

determine that the mobile terminal is not being served by the home node;

obtain a temporary identifier associated with the mobile terminal, establish an at least partially wireless connection between the first network node and the mobile terminal using the temporary identifier, where the at least partially wireless connection includes a visited node that is remote from the home node and does not include the home node;

send the received data packet from the first network node to the mobile terminal via the at least partially wireless connection between the first network node and the mobile terminal;

receive a second data packet, at the first network node, from the mobile terminal, destined for a wireline terminal connected to the packet network; and send the second data packet to the wireline terminal via the packet network.

10. A network node, comprising:

a processor;

an interface to a packet network, the interface connected to the processor; and a memory system connected to the processor, the memory system storing software and information usable by the processor, the software including a connection module to:

receive a data packet from the packet network destined for the mobile terminal;

determine that the mobile terminal is not being served by a home node;

obtain a temporary identifier associated with the mobile terminal establish, using the temporary identifier, a connection that excludes the home node, associated with the mobile terminal, when a visited node that is remote from the home node serves the mobile terminal for communicating the received data packet to the mobile terminal;

receive a second data packet from the mobile terminal destined for a wireline terminal connected to the packet network; and send the second data packet to the wireline terminal via the packet network.

11. The network node of claim 10, where the connection module is further to send the received data packet to the visited node.

12. The method of claim 10, where the temporary identifier is a Temporary Local Directory Number (TLDN).

* * * * *